United States Patent [19]

Thompson

[11] 4,385,045

[45] May 24, 1983

[54] PROCESS FOR PRODUCING ALKALI METAL FERRATES

[76] Inventor: John A. Thompson, 3891 Coco Grove Ave., Miami, Fla. 33133

[21] Appl. No.: 238,371

[22] Filed: Feb. 26, 1981

[51] Int. Cl.$^3$ ............................................. C01G 49/00
[52] U.S. Cl. ................................................... 423/594
[58] Field of Search ......................................... 423/594

[56] References Cited

U.S. PATENT DOCUMENTS 2,835,553  5/1958  Harrison et al. ..................... 423/594

OTHER PUBLICATIONS

Gmelins Handbuch Der Anorganischen Chemie, No. 59, p. 877, 1932.
Scholder et al., "Zeit fur Anorg. und Allgem. Chemie", vol. 283, 1956, pp. 331–337.
Bureau of Mines RI-7535, Jul. 1971, 12 pages (p. 2).
Mellor, "A Comprehensive Treatise on Inorganic & Theoretical Chemistry", vol. 13, 1934, pp. 929–933, Longmans, Green & Co., N.Y.
Miller, "Dissertation Absts.", vol. 36(7), p. 3343, 1976.
Gump, "Dissertation Absts.", vol. 20, 1960, pp. 3502–3503.
Schreyer et al., "Inorganic Synthesis", vol. 4, 1953, McGraw-Hill Book Co., N.Y., 1953, pp. 164–168.

*Primary Examiner*—Herbert T. Carter
*Attorney, Agent, or Firm*—Kenyon & Kenyon

[57] ABSTRACT

Alkali metal iron (IV) and iron (VI) ferrates are produced by the reaction at high temperatures of reactant mixtures of either (a) iron oxide and alkali metal oxide or peroxide or (b) elemental iron and alkali metal peroxide, wherein the reactions are conducted at least in their initial stages in the absence of free oxygen, e.g., in a vacuum or in a inert gas atmosphere.

5 Claims, No Drawings

PROCESS FOR PRODUCING ALKALI METAL FERRATES

BACKGROUND OF THE INVENTION

The present invention relates to alkali metal ferrates and, in particular, to methods for the preparation of alkali metal ferrates where the iron therein has a valence of +4 or +6.

Although the most common and familiar forms of iron in combination with other elements are those wherein iron having a valence or oxidation state of +2 or +3 is present, other compounds of iron, such as compounds of iron (IV) and iron (VI) are known in the art. In particular, ferrates, i.e., salts of iron (IV) or iron (VI) oxyanion, are known for certain heavy metals and alkali or alkaline earth metals. Iron (IV) ferrates (sometimes referred to as "perferrites") ($FeO_3^{2-}$) and iron (VI) ferrates ($FeO_4^{2-}$) are recognized oxidizing agents. Iron (VI) ferrates, in particular, are very strong oxidizing agents in aqueous solution, and stable, water soluble ferrates such as potassium or sodium ferrate are, therefore, particularly useful.

Utilization of the potentially advantageous oxidizing properties of iron (IV) and iron (VI) ferrates has been hampered by the unavailability of inexpensive, simple means for the synthesis of economical yields of sufficiently pure forms of these compounds. Methods known for production of alkali metal ferrates include electrochemical techniques wherein a 35-40% NaOH solution is used to convert scrap iron to a concentrated solution of $Na_2FeO_4$ ($H_2$ and $O_2$ being by-products) using 10-15 cm$^2$ electrodes with a 2 cm separation and an initial resistance of 2-5 ohms; the wet chemical oxidation of a soluble iron (III) compound by hypochlorite, followed by chemical precipitation of $FeO_4^{2-}$ with potassium hydroxide to form $K_2FeO_4$, followed by re-crystallization to obtain a high purity solid; and fusing iron filings with potassium nitrate and extracting with water.

U.S. Pat. No. 2,835,553 of Harrison, et al. discloses a multi-step process for preparing alkali metal ferrates wherein an alkali metal iron (III) ferrate (typically known as a "ferrite") is reacted at elevated temperature, in the presence of free oxygen, with an alkali metal compound (which may be the same or different than the alkali metal present in the alkali metal (III) ferrate) to produce the ferrate (IV) of the alkali metal or metals. The alkali metal ferrate (III) itself requires synthesis from more readily available materials, e.g., iron oxide. The ferrate (IV) produced in this manner may then be dissolved in water to produce ferrate (VI) according to the following equation (where, e.g., the alkali metal is sodium):

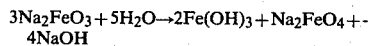

$$3Na_2FeO_3 + 5H_2O \rightarrow 2Fe(OH)_3 + Na_2FeO_4 + 4NaOH$$

In the foregoing processes, either expensive means per se are employed (e.g., electrolysis) or complicated multi-step procedures are required to produce iron (IV) or iron (VI) ferrates from more readily available materials. Moreover, in most cases, the iron (VI) ferrates produced in these methods exist in solution and require a crystallization therefrom in order to avoid the obvious handling, shipping and storage disadvantages associated with aqueous solutions.

SUMMARY OF THE INVENTION

It is an object of the present invention to provide a method for the direct preparation of iron (IV) and iron (VI) alkali metal ferrates from readily-available starting materials.

A further object of this invention is to provide a method for the preparation of alkali metal iron (IV) and iron (VI) ferrates wherein the ferrate is produced in a non-aqueous state.

These and other objects are attained in a process which comprises either:

(a) reacting iron oxide with an alkali metal oxide or peroxide at elevated temperature in an oxygen-free atmosphere; or (b) reacting elemental iron with an alkali metal peroxide at elevated temperature in an oxygen-free atmosphere.

For ease of reference, the reaction described in (a) above hereinafter is referred to as "Reaction I" while that of (b) is referred to as "Reaction II".

Reaction I and Reaction II each result in a substantial yield of alkali metal iron (IV) ferrate which, when dissolved in water, yields iron (VI) ferrate (more literally, $FeO_4^{2-}$ ion). The product resulting from Reaction I and from Reaction II also contains iron (VI) alkali metal ferrate per se.

The significance of these reaction schemes primarily resides in their ability to produce iron (IV) or iron (VI) alkali metal ferrate directly from inexpensive, readily-available starting materials (e.g., iron oxide or elemental iron) without the need for complicated electrochemical procedures, initial preparation of reactants (e.g., to form an iron (III) compound) and the like. In addition, each of the reactions can be employed to obtain yields of iron (VI) ferrates without the need for procedures which result in production of the ferrate in solution.

Preferred alkali metal compounds for use in Reactions I or II are those of sodium, although potassium compounds also may be used to advantage.

With reference to Reaction I, iron oxide is heated with alkali metal oxide or peroxide to produce the desired reaction. These solid reagents preferably are comminuted and initimately mixed either in simultaneous or sequential steps in proportions suitable for the desired reaction. The molar ratio of iron oxide to the alkali metal compound generally is between about 1:1 and about 1:8, and preferably is from about 1:4 to about 1:6, regardless of whether the oxide or peroxide of the alkali metal is employed. An optimum molar ratio where alkali metal oxide is employed is about 1:4 and an optimum for alkali metal peroxide lies at about 1:6. This latter mole ratio also is optimal where the peroxide is employed in a hydrated form, e.g., as an octahydrate.

The comminuted reagents are subjected to a temperature in the range of from about 400° C. to about 700° C., preferably from about 500° C., to about 650° C., in an appropriate vessel such as a tube oven or a stainless steel crucible heated by a suitable point source. The time necessary for reaction may vary considerably depending upon reagents, reagent ratios and, most importantly, temperature, higher temperatures yielding faster reactions. Generally, the reaction is complete after a few hours; however, in some cases, complete reaction occurs in less than one minute. The reaction of the reagents may be conducted at a substantially constant temperature or, alternatively, may be conducted in a stepwise manner with gradual increases in temperature until the reaction is completed.

The reaction is conducted, at least in its initial stages, in the substantial absence of reactive oxygen and, thus, preferably should be carried out in a closed vessel under an inert atmosphere such as nitrogen or argon gas. The presence of reactive oxygen in the system may result in conversion of all or part of the alkali metal reagent to its less reactive superoxide counterpart. However, the requirement for substantial oxygen exclusion from the system is diminished as the reaction proceeds, i.e., as the alkali metal oxide or peroxide is consumed for its intended purpose.

The reaction may be catalyzed if desired using, for example, manganese dioxide (typically at about 0.5 to 1.0 percent by weight of the iron oxide) to lower the temperature requirements necessary to obtain a given rate of reaction.

The product resulting from this Reaction I is a black solid mass and comprises alkali metal iron (IV) ferrate together with other products, including the iron (VI) ferrate of the alkali metal. The reaction product is useful per se as a source of iron (IV) or iron (VI) ferrate or, preferably, as a progenitor for production of a substantial quantity of iron (VI) ferrate therefrom through dissolution of the reaction product in water.

In Reaction II, elemental iron and solid alkali metal peroxide are, as in Reaction I, comminuted and mixed in simultaneous or sequential steps. The molar ratio of iron to peroxide generally is in the range of from about 1:1.8 to about 1:2.5, preferably from about 1:2.0 to about 1:2.5, and optimally about 1:2.3.

The reaction between the alkali peroxide and the elemental iron is highly exothermic and requires only that an initial activation temperature be obtained to initiate the reaction. Typically this activation temperature is about 500° C., at which the reaction proceeds very quickly and fairly violently, although reaction may occur at controlled lower temperatures wherein self-ignition of the mixture is suppressed. Catalysts such as titanium and manganese dioxide at about 0.5 to 1.0% by weight of the elemental iron can be used to achieve lower activation temperatures.

As in Reaction I, oxygen is substantially excluded from at least the initial stages of the reaction by conducting the reaction in a closed atmosphere of an inert gas.

The reaction product of Reaction II is a black solid mass and comprises alkali metal iron (IV) and iron (VI) ferrates, with the iron (VI) ferrates believed to be present in larger proportion than in the reaction product of Reaction I. The Reaction II product, may therefore, be employed per se as a non-aqueous based source of either ferrate or as a source of iron (VI) ferrate upon dissolution in water.

DETAILED DESCRIPTION OF THE INVENTION

The methods of the present invention are described in further detail with reference to the following illustrative, non-limiting Examples.

EXAMPLE 1

2.73 grams of pure $Fe_2O_3$ were mixed with 8 grams $Na_2O_2$ (mole ratio 1:6) and heated in a closed vessel for 2 hours at 500° C. The resultant product, a black solid mass, had a yield of 8.4% iron (VI) ferrate.

The percent yield in this and the following examples was determined by spectrophotometric measurement of the Fe(VI) content of aqueous solutions prepared from the reaction product (pulverized) as compared to solutions prepared from a standard $K_2FeO_4$ prepared according to the method of Schreyer, et al., Anal. Chem. 22:691 (wet chemical oxidation of Fe(III) by hypochlorite, followed by chemical precipitation of $FeO_4^{2-}$ with KOH, forming $K_2FeO_4$ which, upon recrystallization, is substantially pure).

EXAMPLE 2

2.73 grams of $Fe_2O_3$ (flue dust) were mixed with 9 grams of $Na_2O_2$ (mole ratio 1:6) and heated in a covered vessel for 5 minutes at 600° C. The yield of Fe(VI) ferrate was 10.6%.

EXAMPLE 3

5 grams of elemental iron (obtained by hydrogen reduction of iron oxide) were mixed with 16 grams $Na_2O_2$ (mole ratio 1:2.3) and heated in a covered oven for 30 minutes at 600° C. The yield of Fe(VI) was 11.0%.

EXAMPLE 4

0.3 grams $Fe_2O_3$ were mixed with 0.88 grams $Na_2O_2$ (mole ratio 1:6) and heated in a nitrogen atmosphere for one hour at 590° C. The yield of Fe(VI) was 13.6%.

EXAMPLE 5

0.6 grams $Fe_2O_3$ were mixed with 1.76 grams $Na_2O_2$ (mole ratio 1:6) and heated in a nitrogen atmosphere at 600° C. for 40 minutes. The yield of Fe(VI) was 10.7%.

EXAMPLE 6

Example 5 was repeated except that heating was conducted for 45 minutes at 560° C. The yield of Fe(VI) was 11.0%.

EXAMPLE 7

0.7 grams hydrogen reduced elemental iron were mixed with 2.24 grams $Na_2O_2$ (mole ratio 1:6) and heated in a nitrogen atmosphere at 450° C. for 75 minutes and 600° C. for 10 minutes. The yield of Fe(VI) was 11.2%.

EXAMPLE 8

1.5 grams $Fe_2O_3$ were mixed with 4.4 grams $Na_2O_2$ (mole ratio 1:6) and heated in a nitrogen atmosphere at 590° C. for one hour. The yield of Fe(VI) was 10.1%.

EXAMPLE 9

0.7 grams hydrogen reduced iron were mixed with 2.24 grams $Na_2O_2$ (mole ratio 1:6) and heated in a nitrogen atmosphere at 560° C. (where self-ignition commenced) for 2 hours. The yield of Fe(VI) was 12.8%.

EXAMPLE 10

1.0 gram $Fe_2O_3$ was mixed with 2.93 grams $Na_2O_2$ (mole ratio 1:6) and heated in a nitrogen atmosphere at 425° C. for 2 hours. The yield of Fe(VI) was 14.1%.

EXAMPLE 11

0.7 grams hydrogen reduced iron were mixed with 2.24 grams $Na_2O_2$ (mole ratio 1:2.3) and heated in a nitrogen atmosphere at 425° C. for 50 minutes and at 520° C. for 130 minutes. The yield of Fe(VI) was 15.1%.

EXAMPLE 12

1.5 grams hydrogen reduced iron were mixed with 4.8 grams $Na_2O_2$ and successively heated in a nitrogen atmosphere for one hour at 440° C.; for one hour at 520° C.; for 30 minutes at 400° C.; for 50 minutes at 520° C. and for one hour at 560° C. The yield of Fe(VI) was 14.5%.

EXAMPLE 13

Utilizing the same heating sequence of Example 12, 1.0 gram of $Fe_2O_3$ and 2.93 grams $Na_2O_2$ were heated in a nitrogen atmosphere. The yield of Fe(VI) was 15.4%.

In accordance with the present invention, "iron oxide" is intended to refer to any compound consisting of iron and oxygen molecules. As indicated in the foregoing examples, the most readily available, and for this reason preferred, iron oxide is $Fe_2O_3$. However, other oxides of iron such as magnetite, i.e., $Fe_3O_4$ (actually $FeO.Fe_2O_3$) may also be employed in the process of this invention to obtain substantially similar results as those indicated above at similar reaction conditions, molar ratios, etc.

The foregoing description is considered illustrative of the features and advantages of the present invention but is not intended to limit the scope thereof to the particular conditions, desires or values set forth. Indeed, the yields of Fe(VI) shown in the foregoing examples can be significantly increased through use of more purified reactants, more efficient heat sources, optimization of operating conditions and other like features. Moreover, obvious modifications of the present invention, apparent to those skilled in the art, are considered ascertainable without departing from the scope of spirit of the invention defined in the appended claims.

What is claimed is:

1. A method for producing alkali metal iron (IV) ferrate, comprising subjecting a particulate reactant mixture of elemental iron and an alkali metal peroxide, in a respective molar ratio of from about 1:1.8 to about 1:2.5, to a temperature of at least about 500° C. for a time sufficient to bring about an exothermic reaction between said reactants and to form therefrom alkali metal iron (IV) ferrate, said reaction being conducted, at least in its initial stages, in an inert gas atmosphere in the substantial absence of free oxygen.

2. The method according to claim 1 wherein said molar ratio is in the range of from about 1:2.0 to about 1:2.5.

3. The method according to claim 1 wherein said alkali peroxide is sodium peroxide.

4. The method according to claim 1 wherein the product of said reaction is dissolved in water.

5. A method for producing alkali metal iron (IV) ferrate, comprising subjecting a particulate reactant mixture of iron and sodium or potassium peroxide, in a respective molar ratio of from about 1:2.0 to about 1:2.5, to a temperature of at least about 500° C. to initiate an exothermic reaction between said reactants and to form therefrom sodium or potassium iron (IV) ferrate, said reaction being conducted in an inert gas atmosphere.

* * * * *